United States Patent [19]

Washizuka et al.

[11] Patent Number: 4,760,918

[45] Date of Patent: Aug. 2, 1988

[54] POCKETBOOK TYPE ELECTRONIC APPARATUS

[75] Inventors: Isamu Washizuka, Kyoto; Akira Tanimoto, Kashihara, both of Japan

[73] Assignee: Sharp Kabushiki Kaisha, Osaka, Japan

[21] Appl. No.: 54,089

[22] Filed: May 26, 1987

Related U.S. Application Data

[62] Division of Ser. No. 435,271, Oct. 19, 1982, abandoned.

[30] Foreign Application Priority Data

Oct. 20, 1981 [JP] Japan .................. 56-156501[U]

[51] Int. Cl.⁴ .............................................. B65D 73/02
[52] U.S. Cl. ................................... 206/328; 150/52 R; 150/52 J
[58] Field of Search ............... 150/52 R, 52 J

[56] References Cited

U.S. PATENT DOCUMENTS

| 193,139 | 7/1877 | Browne | 150/52 R |
|---|---|---|---|
| 3,530,961 | 9/1970 | Weissenbach | 150/52 R |
| 4,075,702 | 2/1978 | Davis | 150/35 |
| 4,096,577 | 6/1978 | Ferber et al. | |
| 4,141,401 | 2/1979 | Hindemit | 150/52 R |

FOREIGN PATENT DOCUMENTS

| 2061691 | 6/1922 | Fed. Rep. of Germany | 150/52 J |
| 1632560 | 12/1970 | Fed. Rep. of Germany | 150/52 R |
| 1324103 | 3/1963 | France | 150/52 J |

Primary Examiner—Joseph Man-Fu Moy
Attorney, Agent, or Firm—Birch, Stewart, Kolasch & Birch

[57] ABSTRACT

A pocketbook type electronic apparatus includes a pocketbook which comprises inner and outer covers between which is contained an electronic apparatus. When the covers are in a closed position, operation of said electronic apparatus is nevertheless possible. The covers are provided with transparent sections corresponding to the positions of the operating keys, display apparatus and solar cell of the electronic apparatus. Also disclosed is a pocketbook type electronic apparatus wherein the body of the electronic apparatus comprises one of the covers wherein the operating surface of the electronic apparatus is positioned on the outside of such cover.

5 Claims, 3 Drawing Sheets

POCKETBOOK TYPE ELECTRONIC APPARATUS

This application is a divisional of application Ser. No. 435,271 filed on Oct. 19, 1982, now abandoned.

BACKGROUND OF THE INVENTION

The present invention relates to improvements in pocketbook type electronic apparatus, such as a pocketbook type electronic calculator, a pocketbook type translating apparatus, a pocketbook type scheduler, or other similar types of electronic apparatus.

The abovementioned pocketbook type electronic apparatus can have the function of a pocketbook, the function of an electronic apparatus, the function of an electronic protection device, and similar devices, and also be portable, all at the same time. Most conventional apparatus of this type are two-sided folding pocketbooks with the apparatus attached to one of the folding sides. For this reason, when the conventional type is opened up to operate the electronic apparatus, the cover of the one folding side to which the apparatus is not attached (the inside or outside cover) protrudes in some direction while the apparatus is being operated. This becomes an inconvenience, which is disadvantageous.

OBJECT AND SUMMARY OF THE INVENTION

The object of the present invention, in view of this disadvantage which is evident in conventional apparatus of this type, is to provide a pocketbook type electronic apparatus constructed so that it is possible to operate the apparatus when the covers of the pocketbook are closed.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

One embodiment according to the present invention is a pocketbook type electronic apparatus of which the outer surfaces of the inner and outer covers, which make up the pocketbook, provide the operating face for the electronic apparatus, and when the pocket book is closed that electronic apparatus is capable of being operated.

Furthermore, another embodiment according to the present invention is a pocketbook type electronic apparatus constructed so that, when the pocketbook is closed, the operating face is on the outside of one of the inner or outer covers.

BRIEF DESCRIPTION OF THE DRAWINGS

The present invention will be better understood from the detailed description given hereinbelow and the accompanying drawings which are given by way of illustration only, and thus are not limitative of the present invention and wherein.

DETAILED DESCRIPTION OF THE INVENTION

Following is a detailed description of the present invention, with reference to the abovementioned drawings.

Figure 1C:
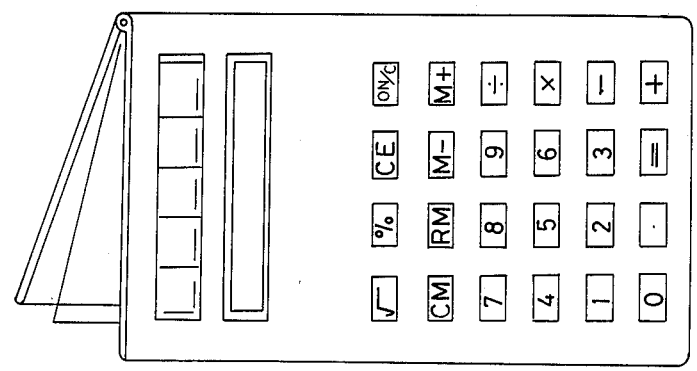
FIG. 1(C) is an outer view of a complete pocketbook type electronic calculator according to the present invention including the components of FIGS. 1(A) and 1(B)
Figure 1B:
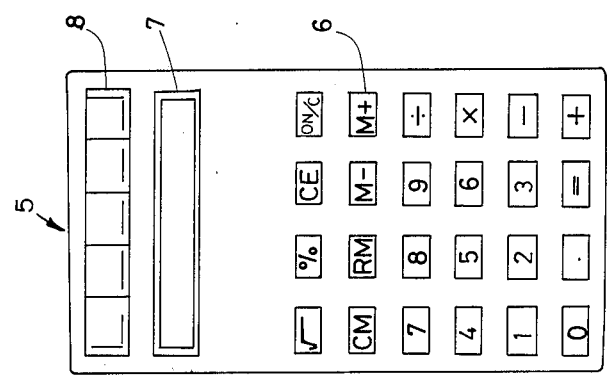
FIG. 1(B) is an outer view of an electronic calculator compatible with the notebook of FIG. 1(A)
Figure 1A:
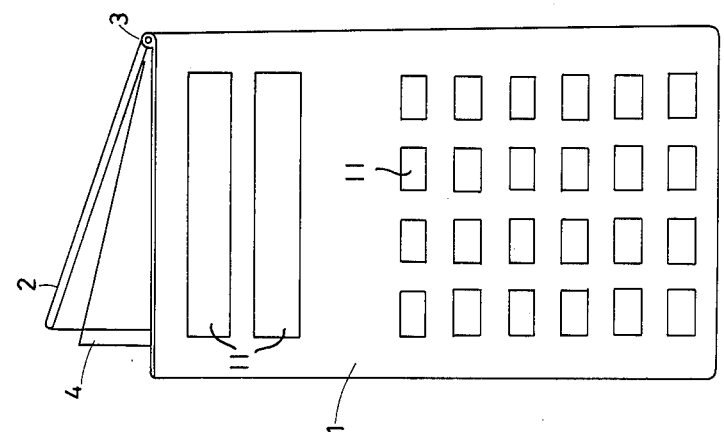
FIG. 1(A) is an outer view of a notebook for holding an electronic calculator according in one embodiment of the present invention.
Figure 2:
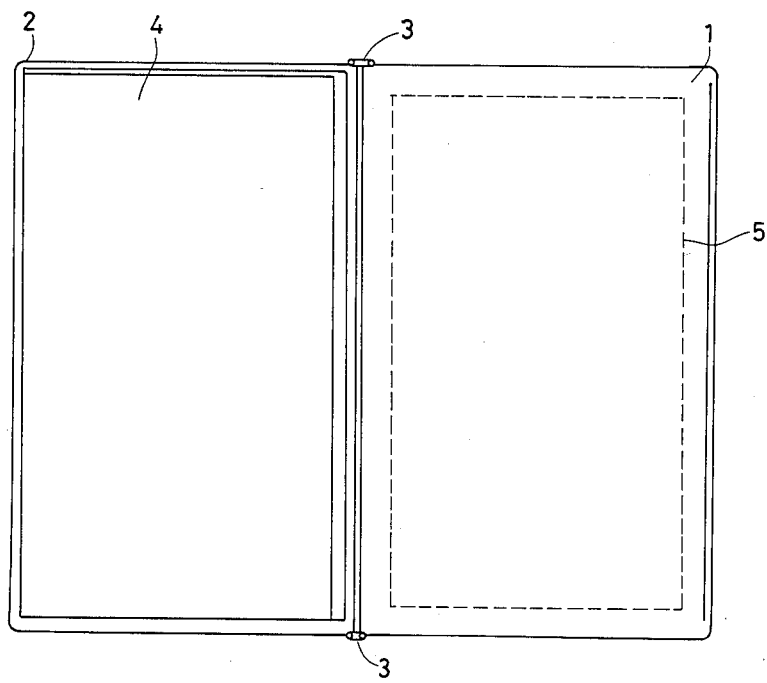
FIG. 2 shows the complete pocketbook type electronic calculator of FIG. 1(C) in the open position.

FIG. 1(A) is a drawing showing the outside view of a notebook for holding an electronic calculator according to one embodiment of the present invention, FIG. 1(B) is a drawing showing the outside view of an electronic calculator compatible with the notebook of FIG. 1(A) according to the present invention, FIG. 1(C) is a drawing showing the outside view of the complete pocketbook type electronic calculator according to the present invention, comprising the components of FIGS. 1(A) and 1(B); and FIG. 2 is a drawing showing the complete pocketbook type electronic calculator of the same embodiment in the open position.

In this embodiment according to the present invention an electronic calculator is inserted into a cover. The adjoining sides of an outside cover 1 and an inside cover 2 are joined together by a hinge 3 to form a freely opening and closing two-sided cover. A transparent case 4 receives and holds a credit card, memo pad, or similar items.

The outside cover 1 is the same size and the same shape as the inside cover 2. Inside cover 2 is a metal plate member fabricated from aluminum or similar material. On the other hand, the outside cover 1 is formed of a soft material, such as vinyl. Outside cover 1 is made up in two layers so that it can receive and contain an electronic calculator 5 between the layers. In addition, in the outer layer of the outer cover 1 there are transparent windows 11 positioned to correspond to the keys, display panel, and solar cell of the electronic calculator which is contained in this outer cover 1. Key section 6, display panel section 7, and a solar cell 8 of the electronic calculator 5 are exposed through these windows or holes.

Through this form of construction, the operation of the electronic calculator is possible with the notebook closed, and when the keys are operated the inner cover 2 no longer protrudes clumsily or constitutes an inconvenience. Also, because the body of the electronic calculator is enclosed in a soft case it is protected from shock and impact.

Furthermore, the outside of the outer cover 1 can be formed of soft vinyl with transparent windows, and the operation of the electronic calculator can be performed from the outer side of this vinyl with satisfactory results. In addition, a lock mechanism can be provided for the notebook so that after the notebook is closed it will not open of its own accord, and this construction will give satisfactory results.

Figure 3:
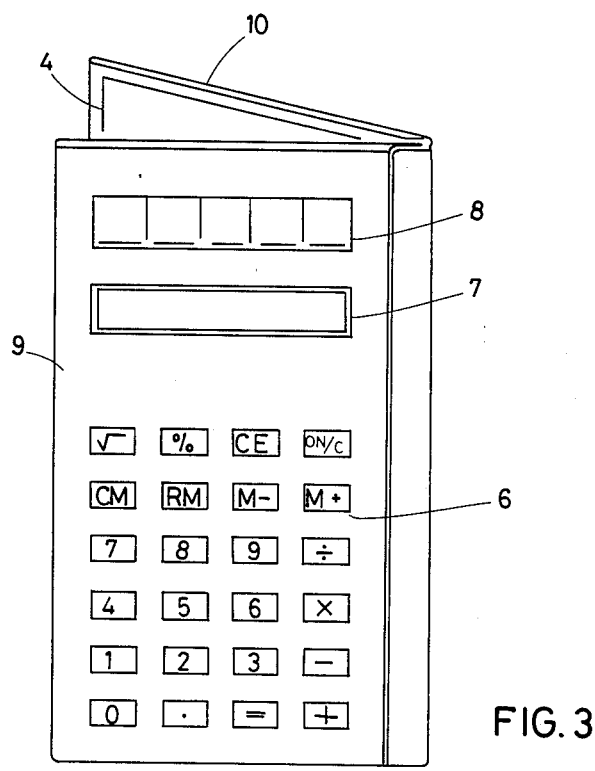
FIG. 3 and FIG. 4 illustrate another embodiment according to the present invention.
Figure 4:
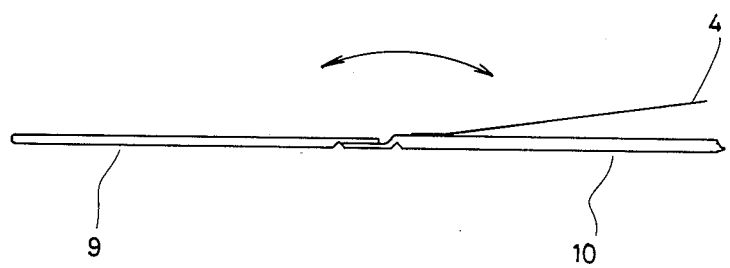

FIG. 3 is another embodiment according to the present invention and FIG. 4 shows the embodiment of FIG. 3 in the open position. In this embodiment the body of an electronic calculator 9 in card form itself comprises the outer cover of the pocketbook, and an inner cover 10 is made up of a soft vinyl member bonded over a cardboard center member. A stepped center section formed in the edge of this body forms a holding case 4 for credit cards and similar objects.

With the abovementioned construction, the pocketbook can be opened and closed in the directions of the arrows shown in FIG. 4. When it is closed the operating face of the electronic calculator 9 is exposed, and, because of this, the operation of the keys, as outlined for the previous embodiment according to the present invention, is facilitated.

By the construction described above, when the pocketbook type electronic apparatus of the present invention is closed, the operation of the electronic apparatus is nevertheless possible, an improvement over conventional types of such apparatus without loss of any of the advantages afforded by the conventional types.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic apparatus comprising:
   a pocketbook comprising first and second covers, each cover comprising an inner surface an an outer surface;
   hinge means connecting said first and second covers together for relative pivotal movement between open and closed positions, said inner surfaces of said first and second covers facing each other when said pocketbook is in the closed position; and
   an electronic device supported by said first cover, said electronic device comprising operating switches and said first cover comprising means for exposing said switches on the outer surface thereof and for facilitating operation of said switches when said pocketbook is in the closed position;
   wherein said means for exposing and facilitating operation of said switches comprises flexible transparent locations in said first cover.

2. An electronic apparatus comprising:
   a pocketbook comprising first and second covers, each cover comprising an inner surface and an outer surface;
   hinge means connecting said first and second covers together for relative pivotal movement between open and closed positions, said inner surfaces of said first and second covers facing each other when said pocketbook is in the closed position; and
   an electronic device supported by said first cover, said electronic device comprising operating switches and said first cover comprising means for exposing said switches on the outer surface thereof and for facilitating operation of said switches when said pocketbook is in the closed position;
   wherein the outer surface of the first cover comprises a flexible, transparent material.

3. An electronic apparatus comprising:
   a pocketbook comprising first and second covers, each cover comprising an inner surface and an outer surface;
   hinge means for connecting said first and second covers together for relative pivotal movement between an open position of said pocketbook and a closed position of said pocketbook, said inner surfaces of said first and second covers facing each other when said pocketbook is in the closed position;
   an electronic calculator supported by said first cover between said inner and outer surfaces thereof, said calculator comprising a numerical display, a solar cell power source and operating switches facing said outer surface of said first cover;
   said outer surface of said first cover comprising a first flexible transparent portion overlying said numerical display of said calculator for facilitating viewing of said display, a second flexible transparent portion overlying said solar cell power source for permitting light to reach said solar cell, and a plurality of additional flexible transparent portions for facilitating both viewing and operation of said operating switches when said calculator is supported by said first cover between said inner and outer surfaces thereof and when the pocketbook is in either the open or closed position.

4. An electronic apparatus as in claim 3, wherein said first, second and additional transparent portions of said first cover comprise respective individual portions comprised of transparent flexible material.

5. An electronic apparatus as in claim 3, further comprising a latch for securing said pocketbook in the closed position, said calculator facing outwardly of said pocketbook and being operable through said first, second and additional flexible transparent portions when said pocketbook is in the closed position.

* * * * *